UNITED STATES PATENT OFFICE.

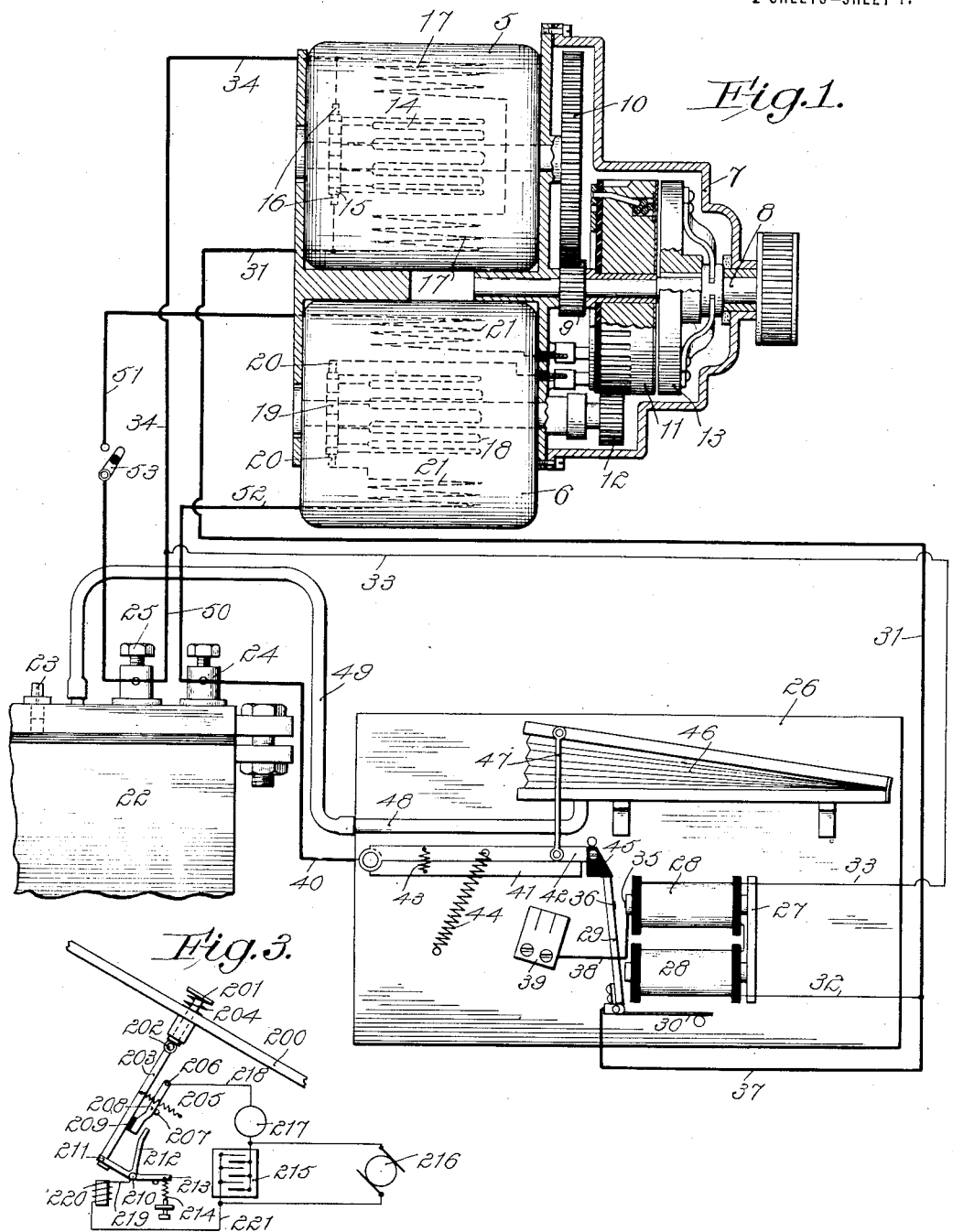

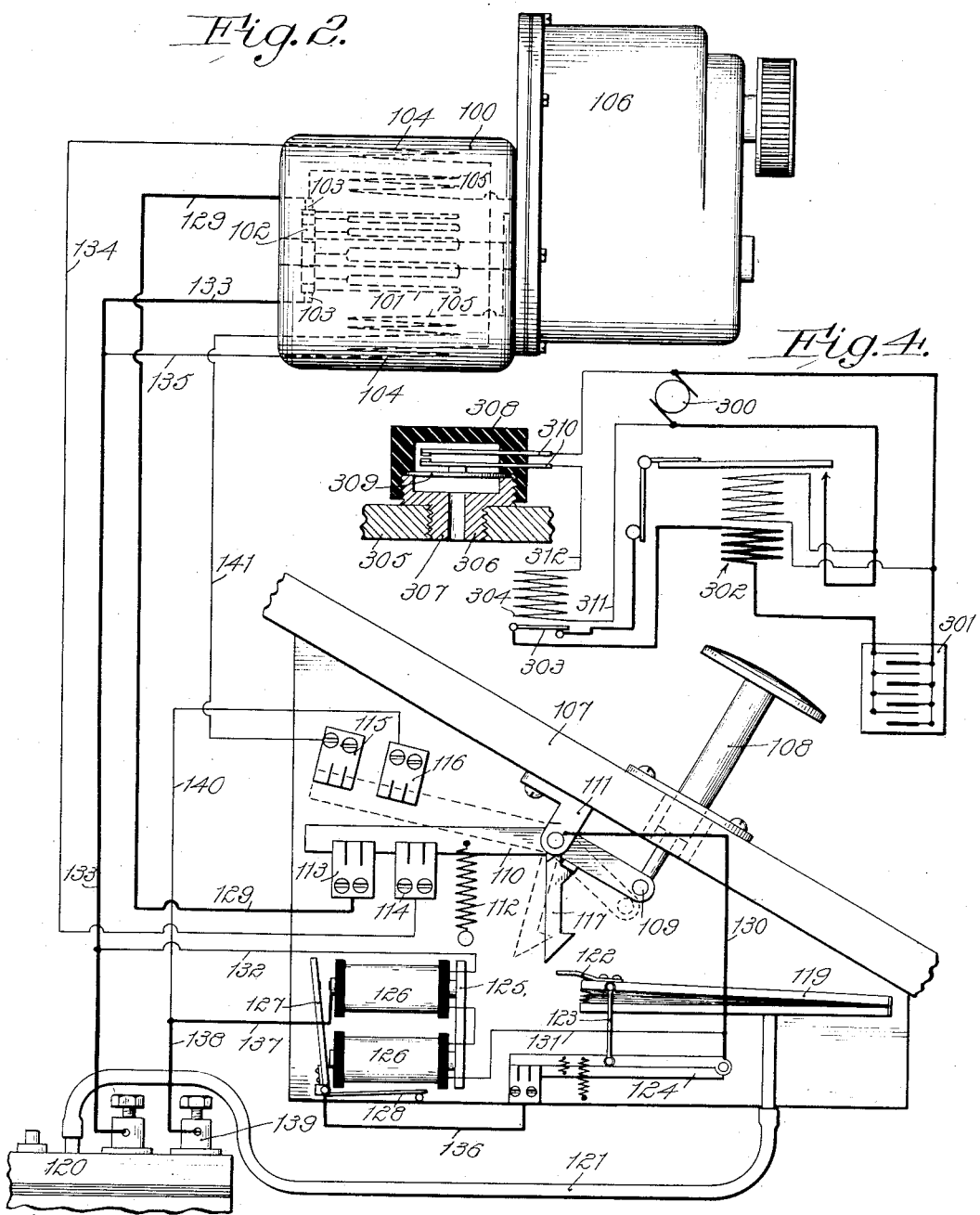

GEORGE M. WILLIS, OF CHICAGO, ILLINOIS, ASSIGNOR, BY DIRECT AND MESNE ASSIGNMENTS, TO CHARLES A. BROWN, HARVEY L. HANSON, AND ARTHUR H. BOETTCHER, DOING BUSINESS UNDER THE FIRM-NAME OF BROWN, HANSON & BOETTCHER.

ENGINE-STARTER.

1,268,776.     Specification of Letters Patent.     Patented June 4, 1918.

Application filed January 14, 1914. Serial No. 811,978.

*To all whom it may concern:*

Be it known that I, GEORGE M. WILLIS, a citizen of the United States, residing at Chicago, in the county of Cook and State of Illinois, have invented certain new and useful Improvements in Engine-Starters, of which the following is a full, clear, concise, and exact description, reference being had to the accompanying drawings, forming a part of this specification.

My invention relates to starters for engines which require the application of some external force to initiate their operation, such devices being commonly employed in connection with internal combustion engines to eliminate the necessity of starting the engine by hand.

My invention relates more particularly to electric engine starters and contemplates an equipment or system wherein an engine driven generator is utilized to charge a storage battery, the energy stored in the battery being subsequently utilized to operate a dynamo electric machine to produce the power necessary to start the internal combustion engine. The present invention provides means for controlling the supply of energy to the storage battery, that is, means for electrically connecting the storage battery with the generator when the generator has developed a predetermined voltage or amperage. I find it convenient to control the charging circuit by means of a voltage coil or pair of voltage coils which are adapted to operate an armature to close the charging circuit when the generator has developed a sufficient voltage to prevent the storage battery from discharging through the generator circuit. In order to prevent overcharging of the battery I provide means operated by the gases generated in the battery casing to open the charging circuit when the battery has been sufficiently charged.

I may state at this point, that the novel features of my present invention are applicable to a two-unit system such as is described in my copending patent applications, Serial Numbers 789,244 and 798,827, filed respectively on September 11, 1913 and November 3, 1913, as well as to a one-unit system such as is shown and described in my patent application, Serial No. 803,893, filed December 1, 1913. By a two-unit system I mean, a system wherein one dynamo-electric machine is operated as a generator to charge a suitable storage battery and another dynamo electric machine as a motor to supply the power to effect the starting of an internal combustion engine with which the system is associated. By a one-unit system I refer of course to a system wherein a single dynamo-electric machine is operated both as a generator to charge the storage battery and as a motor to start an internal combustion engine.

These and other features of my invention are fully described in the following description wherein reference is made to the accompanying drawings in which—

Figure 1 is a view partly in elevation and partly in section illustrating a two-unit engine starting system embodying my present invention. In this view the several circuits are diagrammatically illustrated.

Fig. 2 is a view similar to Fig. 1, showing a somewhat modified arrangement in connection with an engine starter of the one-unit type.

Fig. 3 shows an arrangement for controlling the motor circuit in which arrangement it is only necessary to depress a suitable lever or treadle to close the motor circuit, the motor circuit being maintained closed to permit the motor to start the internal combustion engine and being automatically opened when the internal combustion engine has started under its own power.

Fig. 4 shows a slightly modified arrangement for controlling the charging circuit for the storage battery by means of the gases developed within the battery when the same has been sufficiently charged.

Similar reference numerals refer to similar parts throughout the several views.

Referring first to Fig. 1, I have illustrated an engine starter of the two-unit type comprising a generator 5 and a motor 6 disposed in superposed relation and connected by a suitable frame-work, as shown. Supported by the frame-work is a casing 7, and within this casing is located certain gearing and clutch mechanism, all of which is fully described and shown in my copending application, Serial No. 798,897, filed November 3, 1913. It will suffice to say that at 8 is shown a shaft adapted to be connected with the fly-wheel or other rotatable element of an internal combustion engine, this shaft being connected through a pinion 9 and gear 10 with the armature shaft of the generator 5. Loosely mounted upon the shafting is a clutch disk 11, provided with peripheral teeth meshing with a pinion 12 on the armature shaft of motor 6.

Splined upon the shaft 8 is another clutch disk 13 adapted when attracted into engagement with the clutch disk 11 to operatively connect the armature shaft of the motor 6 with the shaft 8 upon which the clutch disks are disposed. Attention is called to the fact that the clutch disk 11 is provided with a suitable energizing coil connected in series with one of the brushes and one of the field windings of the motor.

The generator shown at 5 comprises armature windings 14, commutator segments 15, brushes 16 and field windings 17, connected in shunt of the brushes 16, all of which are diagrammatically illustrated by means of dotted lines.

The motor shown at 6 comprises armature windings 18, commutator segments 19, brushes 20 and series field windings 21. Attention is directed to the fact that the motor circuit is opened between one of the brushes 20 and one of the field windings, the leads from said brush and field winding being electrically connected with the energizing winding of the clutch disk 11.

At 22 I have illustrated a portion of a storage battery, said battery being provided with a restricted vent or outlet 23, the purpose of which will presently be explained. The positive terminal of the battery is shown at 24 and the negative terminal is shown at 25. Located in proximity to the battery or mounted thereon, if desired, is a board or panel 26 upon which is mounted a magnet 27 comprising voltage coils 28. The magnet 27 is provided with an armature 29 normally held out of engagement with the magnet by means of a spring 30. It is to be noted that the voltage coils 28 of the magnet 27 are normally connected across the brushes of the generator 5 by means of conductors 31, 32, 33 and 34. Disposed upon one of the arms of the magnet 27 is a platinum contact point 35 and carried by the armature 29 is a corresponding contact point 36. A conductor 37 affords electric connection between the armature 29 and the conductor 31. The contact point 35 previously referred to, is connected by means of a conductor 38 with the stationary element 39 of a switch, the movable element of which is connected by means of a conductor 40 with the positive pole of the battery. The movable element of the knife switch comprises the arms 41 and 42 disposed in the same vertical or horizontal plane as the case may be. A helical spring 43 normally tends to draw the arms 41 and 42 together and a helical spring 44 tends to move the arms 41 and 42 to closed position. When the movable element of the knife switch is in closed position the arm 41 is disposed between the jaws of the stationary switch member 39 and the arm 42 may be disposed between the jaws or not, as desired. Fixed upon the free end of the arm 42 is a block 45 of insulation adapted to be held by the armature 29 when the several parts are in the positions shown in Fig. 1.

Supported by the board or panel 26 is a suitable bellows 46 and connecting the movable wall of the bellows with the free end of the arm 42 of the movable element of the knife switch is a link 47. Attention is directed to the fact that the interior of the bellows is connected by means of the tubes 48 and 49 with the space above the electrolyte within the storage battery casing. In practice I prefer to have the passage connecting the bellows and storage battery comparatively short but it has been more convenient to illustrate a somewhat long passage in the drawings in order that the disclosure may not appear over-crowded.

A conductor 50 connects the conductor 34 leading from one of the brushes of the generator with the negative terminal 25 of the storage battery. A suitable conductor 51 connects the negative terminal 25 of the storage battery with one of the field windings of the motor 6 and a similar conductor 52 connects the other field winding with the positive terminal of the battery. Interposed in the conductor 51 is a suitable switch 53 preferably located within easy reach of the driver of the automobile, with which the starter is associated. The switch illustrated at 53 is intended to represent any conception of a switch as the present invention is not concerned with the details of this switching mechanism.

I shall now explain the operation of the mechanism just described. For convenience I shall first explain how the battery is charged by the generator and then explain how the motor is operated by the energy stored in the battery. Assuming the engine with which the shaft 8 is mechanically connected, to be running, the armature shaft of the generator is driven through pinion 9 and gear 10, thus causing a flow of electric energy through conductor 31, conductor 32, the voltage coils 28 of the magnet 27, the conductor 33 and the conductor 34, back to the generator. The voltage coils 28 mounted on the magnet 27 are at all times connected across the terminals of the generator 5. When the voltage developed by the generator has reached a certain point, say, six volts, the magnet 27 is sufficiently energized to attract the armature 29, whereupon the spring 44 snaps the arms 41 and 42 of the movable element of the switch to closed position. An electric circuit is then closed through conductors 31 and 37, the armature 29, the contacts 35 and 36, the conductor 38, the knife switch and conductor 40 to the positive terminal 24 to charge the battery and thence from the negative terminal 25 of the battery, through conductors 50 and 34, back to the generator. When the battery has been charged and over-charging commences, gases are generated within the battery casing and these gases are produced in such a volume that they cannot entirely escape through the restricted vent 23; a portion of the gases, therefore, passes through the tubes 48 and 49 to the bellows 46 which is consequently inflated. When the bellows is so inflated the arm 42 of the knife switch is drawn away from the stationary member 39 of the switch. When the spring 43 has been stretched to a certain point the energy therein stored is sufficient to snap the arm 41 out of electrical engagement with the stationary member 39 of the switch. This is, of course, desirable inasmuch as it prevents sparking. When the movable member of the knife switch is moved to open position the charging circuit is of course opened. Attention is called to the fact that the energy stored in the battery may be utilized for lighting, ignition, or any other similar purposes as well as for the purpose of operating the motor 6. Assuming this to be the case after the charging circuit has been opened if it is again desirable to charge the battery, the major portion of the gases previously generated has escaped through the restricted vent 23 and the spring 44 is enabled to draw the movable switch member to closed position. When this occurs the charging circuit is again closed and the battery charged until sufficient gases have been generated to again actuate the bellows to operate the knife switch. If, at any time during the charging operation the voltage developed by the generator is insufficient to hold the armature 29 of the magnet 27 in closed position the spring 30 moves the armature to open position and opens the charging circuit. When the voltage has again risen to the proper point the armature is again attracted and the charging circuit is closed provided the knife switch is in closed position.

Assuming the engine and all of the starter devices shown at Fig. 1, to be at rest and it is desirable to start the engine, the switch 53 is closed, whereupon current flows from the positive terminal 24 of the battery through the conductor 52 to one of the field windings of the motor, thence through the armature windings, the energizing winding of the clutch disk 11, the other field winding in the motor, conductor 51 and switch 53 to the negative terminal of the battery. When the switch 53 is closed there will be a large unrestricted flow of current through the energizing winding of the clutch disk 11 due to the fact that the inertia of the motor armature delays its response to the attraction of the fields. This will immediately attract the clutch disk 13, into driven relation with the clutch disk 11, thus operatively connecting the shaft of the motor 6 with the internal combustion engine. It is assumed of course, that the engine conditions are such that when the engine shaft is turned it will result in the starting of the engine as is well known in the art. This being the case, when the motor armature responds to the attraction of the fields, the engine will be started. When the engine has developed its own movement the load is removed from the motor shaft, due to the induction effect of the rotating armature, a charge of counter electromotive force is developed in the motor circuit. The result is a prompt drop in the current flow through the energizing winding of the magnetic clutch disk 11 and a corresponding reduction in the magnetic effect of the clutch disk. The springs associated with the clutch disk 13 thereupon withdraw the clutch disk 13 from driven engagement with clutch disk 11 and so break the mechanical connection between the motor 6 and the shaft of the internal combustion engine. The operator may open the switch 53 any time after mechanical connection between the motor 6 and internal combustion has been broken.

Referring now to Fig. 2 of the drawings, it will be seen that I have illustrated a starter of the one-unit type. At 100 I have illustrated a dynamo electrical machine adapted to be operated both as a generator and as a motor, said dynamo electric machine comprising armature windings 101, commutator segments 102, brushes 103, field windings 104 which are connected in shunt of the brushes 103 when the dynamo electric machine is operating as a generator, and field windings 105 which are utilized as series field windings when the dynamo electric machine is operating as a motor.

At 106 I have illustrated a casing within which may be located suitable gearing and clutching mechanism of the type as shown and described in my copending patent application, Serial No. 803,893 filed December 1, 1913. It will suffice to say that the clutching mechanism located within the casing 106 comprises an energizing coil included in the series circuit when the dynamo electric machine is operated as a motor. The present invention is not particularly concerned with the devices for mechanically connecting the shaft of the dynamo electric machine with the internal combustion engine, so it will be unnecessary for me to go into a detailed description of this phase of the invention at this time.

At 107 I have shown a portion of the floor of an automobile and operatively mounted in a cylinder bearing carried by the floor is a plunger 108 arranged to be operated by the foot of the driver of the machine. This plunger is pivoted at 109 to the short arm of a switch lever 110 pivoted to a bracket 111 carried on the under side of the floor of the machine. A helical spring 112 acting between the lever 110 and a pin carried by a stationary portion of the machine normally tends to hold the switch lever 110 in electrical engagement with the jaws illustrated at 113 and 114.

At 115 and 116 I have illustrated another pair of jaws arranged to be engaged by the lever 110 when the plunger 108 is depressed. Mounted on the same pivot with the lever 110 is a catch 117 movable in one direction independently of the lever 110 as illustrated. That is,—the catch may be swung to the left independently of the lever but when the plunger 108 is depressed to move the switch lever 110 the catch is swung to the left to release the stop which the catch engages and which stop will be hereinafter referred to.

I have shown a bellows 119 having communication with a storage battery 120 through a tube 121 as shown. Fixed to the movable wall of the bellows is a stop 122 arranged to be engaged and held by the catch 117 when the bellows is inflated and when the catch is in the position indicated in full line. The movable wall of the bellows is also connected by means of a link 123 with the movable element 124 of a knife switch, said knife switch being similar in all respects to the knife switch associated with the bellows 46 in Fig. 1 of the drawings.

At 125 I have shown a magnet and disposed upon said magnet are the voltage coils 126—126, the magnet 125 being provided with a pivoted armature 127, which armature is normally retained out of engagement with a magnet by means of a spring 128.

For convenience in explaining the operation of the mechanism illustrated in Fig. 2 of the drawings I shall first describe the operation when the internal combustion engine is driving the dynamo electric machine as a generator to charge the storage battery. When the dynamo electric machine is being so driven as a generator current flows from the dynamo electric machine through conductor 129 to the jaws 113, with which the switch lever 110 is in electrical engagement. Thence through the switch lever 110 and the conductor 130, thence through conductor 131, voltage coils 126, conductor 132 and conductor 133, back to the dynamo electric machine. While the dynamo electric machine is being so operated as a generator the field windings 104—104 are connected in shunt by means of the conductors 134 and 135, the former conductor being electrically connected with the switch jaw 114 and the latter being connected with the conductor 133. When sufficient voltage has been developed to attract the armature 127 a charging circuit is established through conductor 129, switch jaws 113, switch lever 110, conductor 130, knife switch 124, conductor 136, the armature 127, conductor 137 and conductor 138 to the positive terminal 139 of the battery and thence from the negative terminal of the battery through conductor 133 back to the dynamo electric machine. Provided sufficient voltage is maintained to retain the armature in attracted position the charging of the battery continues until sufficient gases are developed to inflate the bellows 119, whereupon the knife switch 124 is operated and the charging circuit is opened. When the bellows are so inflated the stop 122 riding on the oblique lower end of the catch 117 swings said catch to the left after the bellows has been fully expanded, which catch swings back to its normal position and prevents the retracting spring associated with the knife switch 124 from drawing the bellows 119 to deflated position.

When the dynamo electric machine is to be operated as a motor to start the internal combustion engine, the plunger 108 is depressed, thus moving the switch lever 110 to position shown in dotted lines and at the same time releasing the stop 122 from the catch 117. When this takes place, current flows from the positive terminal 139 of the battery through conductor 138 and conductor 140 to the switch jaws 116, thence through switch lever 110 to the switch jaws 115, thence through conductor 141 to one of the series field windings 105 thence through the energizing coil associated with the clutching mechanism thence through the other series field coil 105, thence through the armature windings of the dynamo electric machine and thence through conductor 133 back to the negative terminal of the battery.

From the above description it will be seen that after the plunger 108 has been depressed the motor circuit is closed and that said motor circuit remains closed only as long as the plunger 108 is retained in depressed position. As soon as the plunger 108 is released the detracting spring 112 moves the switch lever 110 to normal position and places the circuit in condition for charging the storage battery provided the dynamo electric machine is generating a sufficient voltage and provided the storage battery is in a condition to be charged. Attention is directed to the fact that when the arrangement illustrated in Fig. 2 is employed, and after the bellows has been inflated to open the knife switch 124, the knife switch remains open until after the plunger 108 has been depressed to close the circuit for operating the dynamo electric machine as a motor to start the internal machine. The arrangement shown in Fig. 2 is particularly adapted to systems wherein the energy stored in the battery is utilized only for the purpose of operating the dynamo electric machine as a motor. It might not be convenient to lock the knife switch 124 in open position if the storage battery be utilized for lighting and ignition purposes.

In Fig. 3 of the drawings I have illustrated an arrangement whereby after the circuit for a suitable starting motor has been closed, the circuit remains closed until the energy which the battery is capable of supplying falls to a predetermined point, the motor circuit being then automatically opened to prevent the battery from being entirely discharged. In Fig. 3 I have illustrated at 200 a portion of an automobile floor and operating in a suitable cylinder bearing is a plunger 201 pivoted at 202 to an arm 203. A spring 204 tends to retain the plunger 201 in raised position and a spring 205 normally tends to swing the arm 203 to the right. Pivoted at 206 and normally resting against the pin 207 is a conductor arm 208 provided with a block of insulation 209 resting against the arm 203. Pivoted at 210 is a member comprising three arms, 211, 212, 213, the arm 211 normally bearing against the lower end of the arm 203 and the arm 213 being held against a suitable stop pin as shown by means of a spring 214. Suitable devices are provided for regulating the tension of said spring.

At 215 I have illustrated a storage battery and connected across the terminals of said storage battery is a generator 216. Having one terminal connected with one of the terminals of the storage battery 215 is a motor 217, the other terminal of which is connected by means of a conductor 218 with the conductor arm 208. A conductor 219 leads from the arm 211 to a winding 220, wound on a suitable core and connecting the winding 220 with the battery is a conductor 221.

The generator shown at 216 is of course employed to charge the storage battery and the motor 217 may be operatively connected with an internal combustion engine to furnish the power necessary to initiate the operation of the internal combustion engine. When the motor 217 is to be operated the plunger 201 is depressed, thus moving the arm 211 down against the core of the winding 220 and the arm 212 is brought into electrical engagement with the conductor arm 208. The motor circuit is then closed through conductor 218, conductor arm 208, arm 212, conductor 219, winding 220, and conductor 221. As soon as the motor circuit has been closed the winding 220 is energized and the arm 211 is held in engagement with the core of the winding 220, thus maintaining electrical connection between the arm 212 and the arm 208. It will be seen that even though the plunger 201 be released the motor circuit will be maintained closed. As soon as the internal combustion engine with which the motor is associated is running under its own power, there is generated in the motor a counter-electromotive force which neutralizes the magnetic effect of the winding 220 and releases the arm 211, thereby opening the motor circuit. It will be seen that after the operator has depressed the plunger 201, it will not be necessary for him to retain the plunger in depressed position until the internal combustion engine is started as the circuit will be automatically retained in closed condition until the internal combustion engine is running under its own power.

In Fig. 4 of the drawings I have illustrated a generator at 300 and at 301 I have illustrated a storage battery designed to be charged by said generator. A regulator of the usual type is illustrated at 302, the charging circuit being closed through the armature 303 of a magnet 304. At 305 I have illustrated a portion of a storage battery and threaded into the battery casing is a plug comprising the lower portion 306, having a threaded nipple 307 and a cap 308 of insulation. Clamped between the portion 306 and cap 308 is a diaphragm 309 arranged when raised to close a circuit through a pair of contacts 310 mounted in the cap 308. Attention is called to the fact that the winding of magnet 304 is connected by means of a conductor 311 with one terminal of the generator 300 and that a conductor 312 connects said winding with one of the contacts 310, the other one of said contacts being connected with a terminal of the generator. It will be seen that when the storage battery 301 has been charged and gases have been developed therein, said gases will pass through the nipple threaded into the portion 305 of the battery 301 to raise the diaphragm within the plug, thus bringing the contacts 310 into electrical engagement with each other and closing a shunt circuit including the magnet winding 304. When this occurs the armature 303 is attracted, thus opening the charging circuit.

In employing the arrangements disclosed in the foregoing description, I find that it is desirable to so arrange the several parts that after over-charging of the battery begins to take place, a certain time interval will elapse before the charging circuit is opened. For instance, I may so adjust the spring devices which tend to hold the bellows deflated that after over-charging has commenced a certain amount of time elapses before the bellows is affected by the generated gas to open the charging circuit. By so doing I am enabled to prevent the accumulation of sulphate on the battery plates and to get rid of the sulphate which accumulates while the battery is idle.

While I have illustrated my invention in the particular embodiments herein described, I do not limit myself to these precise constructions, but desire to claim any equivalents thereof coming within the terms or spirit of the appended claims.

What I claim as new and desire to secure by Letters Patent of the United States is:

1. In combination a generator, a storage battery arranged to be charged by said generator, a first normally closed switch in said charging circuit, said battery comprising a closed receptacle, devices operated by the gases generated in the storage battery adapted to open said switch when the battery has been sufficiently charged, locking mechanism for said devices, and a second normally closed switch in said circuit adapted when moved to open position to release said devices from said locking mechanism.

2. In combination, a generator, a storage battery adapted to be charged by said generator, a charging circuit, said battery comprising a closed receptacle, a normally closed switch in the charging circuit, a bellows operated by gases generated in the battery adapted to open said switch when the battery has been sufficiently charged, a second switch in said charging circuit, and mechanism for locking said bellows in inflated position, said mechanism being moved to non-locking position when said second switch is opened.

3. In combination, a generator, a storage battery adapted to be charged by said generator, a charging circuit, said battery comprising a closed receptacle, a normally closed switch in the charging circuit, a device operated by gases generated in the battery adapted to open said switch when the battery has been sufficiently charged, a manually controlled switch in the charging circuit, and a locking member movable in one direction independently of said second switch adapted to lock said gas operated device in actuated position, said locking member being moved to non-locking position when said manually controlled switch is opened.

4. In combination, a generator, a storage battery, adapted to be charged by said generator, said storage battery comprising a closed receptacle, a charging circuit, a normally closed switch in said charging circuit operated by the gases generated in the battery, mechanism for locking the switch in open position and a manually operated switch in said charging circuit, said locking mechanism being moved to non-locking position to release the first switch when the second switch is opened.

5. In combination a dynamo electric machine adapted to operate both as a motor and as a generator, a storage battery adapted to be charged when the machine operates as a generator, said battery comprising a closed receptacle, a switch in said charging circuit adapted to be opened when a quantity of gas is generated in the battery, means for locking said switch in open position, a manually operated switch, a motor circuit, said switch when in one position forming a part of the charging circuit and in another position forming a part of the motor circuit, and spring means normally holding said switch in the position wherein it forms a part of the charging circuit, said locking means being released when said last mentioned switch is moved from normal position.

6. In combination a dynamo electric machine adapted to operate both as a motor and as a generator, a storage battery, a battery charging circuit, a motor circuit, a switch in the charging circuit moved to open position when a quantity of gas is generated in the storage battery, a second switch adapted when in one position to form a part of the charging circuit and when in another position to close the motor circuit, and means for locking the first switch in open position released when the second switch is operated to close the motor circuit.

7. In combination a dynamo electric machine adapted to operate both as a motor and as a generator, a storage battery, a battery charging circuit, a switch in the charging circuit adapted to be opened when a quantity of gas is generated in the storage battery, a second switch adapted when in one position to form a part of the charging circuit and when in another position to close the motor circuit, spring means for holding said second switch in position to form a part of the charging circuit and means for locking the first switch in open position released when the second switch is operated to close the motor circuit.

8. In combination a generator, a storage battery, connections between the battery and generator, a gas operated switch in said connections for breaking the charging circuit, a switch in series with the charging circuit, and means controlled by operation of said series switch for locking the gas controlled switch in open position.

9. In combination, a storage battery, a generator, and a charging circuit connecting the battery and generator, a switch in said circuit, means controlled by the generation of gases in the battery while charging to open said switch, and means to retard the action of said gas operated means during 5 predetermined time after the battery has started to generate gas.

In witness whereof, I hereunto subscribe my name this 7th day of January, A. D., 1914.

GEORGE M. WILLIS.

Witnesses:
A. G. McCaleb,
August H. Arndt.